United States Patent [19]

Terashita

[11] 4,394,078
[45] Jul. 19, 1983

[54] METHOD OF CONTROLLING EXPOSURE

[75] Inventor: Takaaki Terashita, Minami-ashigara, Japan

[73] Assignee: Fuji Photo Film Co., Ltd., Kanagawa, Japan

[21] Appl. No.: 193,155

[22] Filed: Oct. 2, 1980

[30] Foreign Application Priority Data

Oct. 3, 1979 [JP] Japan .................................. 54-127655

[51] Int. Cl.³ ................................................ G03B 7/08
[52] U.S. Cl. ...................................................... 354/31
[58] Field of Search ........................................... 354/31

[56] References Cited

U.S. PATENT DOCUMENTS 3,717,077  2/1973  Harvey .................................... 354/31
4,176,955 12/1979  Yamada et al. ......................... 354/31
4,214,826  7/1980  Uchida et al. .......................... 354/31

Primary Examiner—Russell E. Adams
Attorney, Agent, or Firm—Pasquale A. Razzano

[57] ABSTRACT

The exposure of a camera is controlled based on the scene brightness measured by use of a number of light measuring elements located at positions to receive light through from the scene. The light receiving area is divided into several zones. In each of the zones, at least one light measuring element is provided to measure the brightness of the scene in each zone and are used to give the maximum or minimum brightness (Bzi) in each zone. Exposure is controlled based on a weighted mean value $$\sum_{i=1}^{n} K_{i+2} Bzi$$

($K_{i+2}$ is a coefficient). In a preferred embodiment of the invention, another brightness ($B_0$) such as a simple mean value of the outputs of all the light measuring elements is obtained, and the exposure is controlled based on the scene brightness B determined by the formula of $$B = K_1 + K_2 \cdot B_0 + \sum_{i=1}^{n} K_{i+2} Bzi.$$

1 Claim, 15 Drawing Figures

F I G.I
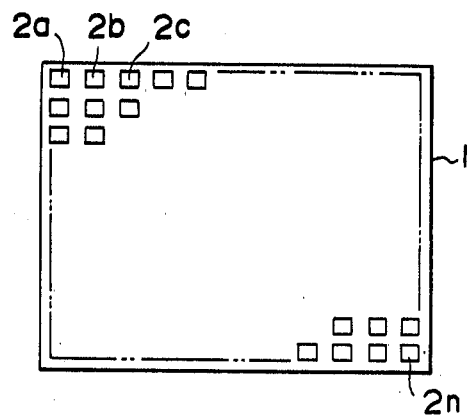
F I G.2
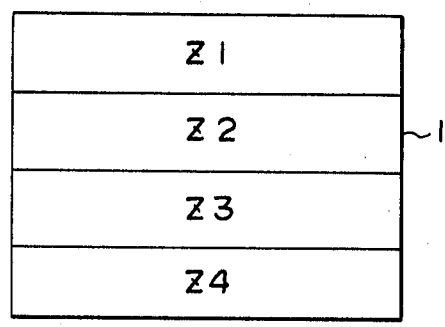
F I G.3
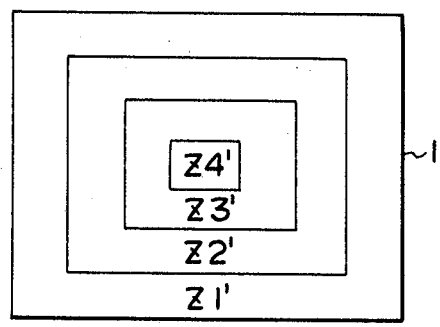

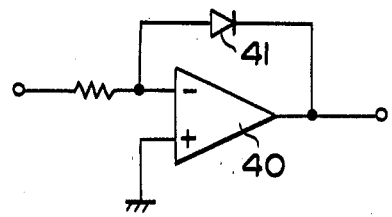
FIG. 9
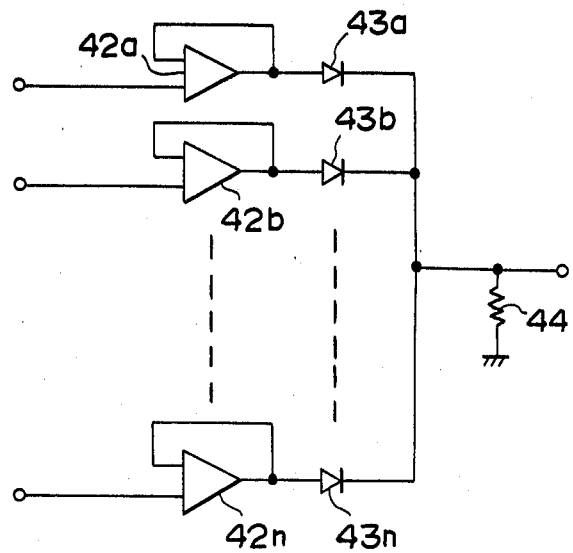
FIG. 10
FIG. 11
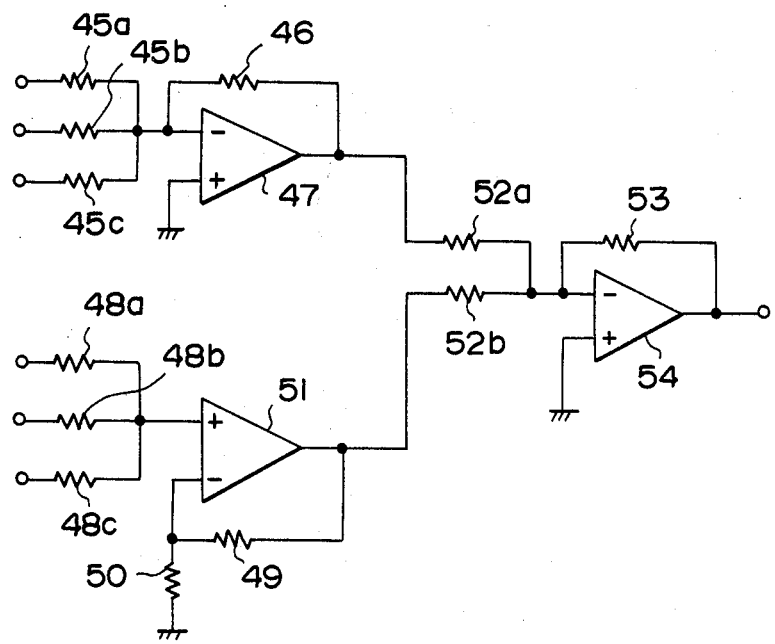

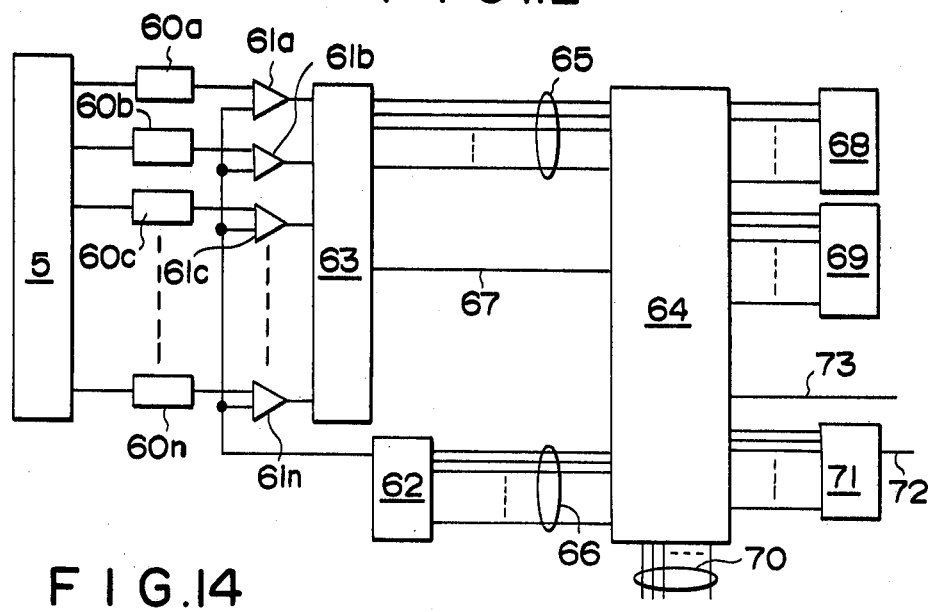
F I G. 12
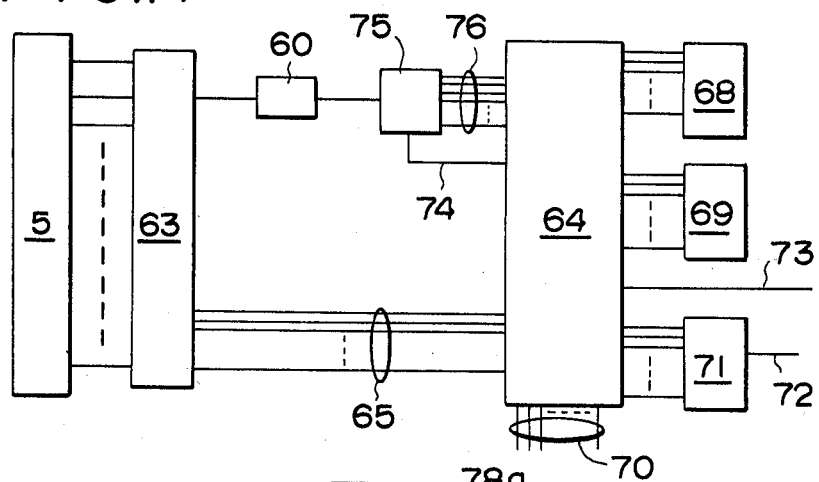
F I G. 14
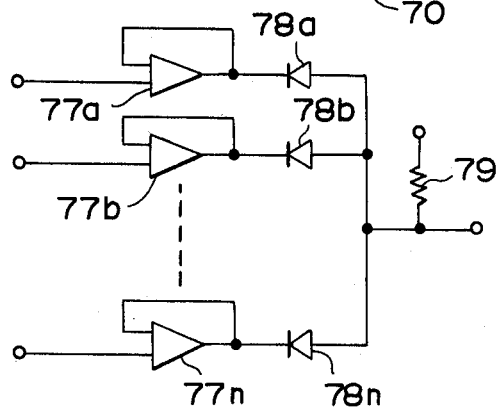
F I G. 15

METHOD OF CONTROLLING EXPOSURE

BACKGROUND OF THE INVENTION

1. Field of the Invention

This invention relates to a method of controlling exposure for use in a photographic camera, and more particularly to a method of giving information for exposure control based on the brightness of the object to be photographed measured by means of a number of light measuring elements arranged over the whole image area of the image object.

2. Description of the Prior Art

In the photographic camera, it has been known to automatically control the exposure based on the brightness of the object to be photographed measured by a light measuring means incorporated in the camera. As the light measuring means, one or two light measuring elements are used for measuring the scene brightness at a position where the element or elements receive light from the object. Further, there have been known in the art two light measuring systems one of which is a system for measuring the average brightness of the scene and the other of which is a system for measuring the brightness of the central part of the scene.

Recently, there has been proposed a new light measuring system for use in a photographic camera in which a number of light measuring elements are used for measuring the brightness of various parts of the scene and the average value of the maximum brightness and the minimum brightness is calculated based on the outputs of the number of light measuring elements. This system is capable of providing proper exposure even when the scene involves high-light parts and/or shadow parts.

When the brightness of the scene has a large distribution as large as 5EV (exposure value) or more, the exposure must be controlled so that the main subject matter may be photographed with appropriate exposure. In the above described systems, however, the subject matter cannot always be photographed at appropriate exposure. For instance, when the subject matter is in a back light, namely in a bright background, the exposure of the main subject matter becomes under, and when the background is very dark like a spot-lighted subject on a stage the exposure thereof becomes over.

SUMMARY OF THE INVENTION

The object of the present invention is, therefore, to provide a method of controlling exposure for a camera in which the main subject matter is always photographed with the appropriate exposure regardless of the brightness distribution of the scene.

The present invention is characterized in that the image area or light measuring area covering the scene to be photographed is divided into a number of zones in each of which at least one light measuring element is disposed to measure the brightness of the scene in the zone. When only one element is disposed in one zone, the element provides the brightness representing the mean brightness of the zone. When more than one element is disposed in one zone, the elements are used to provide the maximum or minimum brightness of the zone. The outputs of the light measuring elements are weighted and then averaged to obtain a weighted mean value of the brightness of the aimed scene.

In a preferred embodiment of the present invention, the outputs of the whole light measuring elements are used for obtaining the simple mean value of the scene brightness in addition to said weighted mean value and the former is added to the latter to control the exposure further based on the brightness level of the scene.

In accordance with the present invention, the various parts of the scene are weighted before calculating the average or final brightness to be used for controlling exposure. It is therefore possible to reduce the influence of not so important parts of the scene such as the sky, windows or shades and control the exposure based on the really important subject matter.

In more detail, in accordance with the present invention, the scene brightness (B) is determined by the following formula;

$$B = K_1 + K_2 \cdot B_0 + \sum_{i=1}^{n} K_{(i+2)} B_{zi} \qquad (1)$$

wherein $B_{zi}$ is the maximum or minimum brightness in each zone, $B_0$ is the average brightness of whole the scene, and $K_1$, $K_2$ and $K_{i+2}$ are coefficients. The coefficients $K$ are properly determined by repeated experiments by use of the light measuring elements which are equivalent to those incorporated in the camera. "n" is the number of the zones in which the scene is divided. The average brightness $B_0$ of whole the scene may be the simple mean value of the outputs of all the light measuring elements, or a modified mean value like a weighted mean value of the outputs of all the zones. Further, the brightness $B_0$ may be the maximum or minimum brightness of the scene. Therefore, the above formula means that the exposure is controlled based on the average brightness of the particular parts of the scene corrected by the weighted brightness of the whole scene or by the maximum or minimum brightness of the scene. In case that the brightness $B_0$ is the maximum brightness, the brightness obtained from the outputs of the zones should preferably be based on the minimum value in the zones, and vice versa. In other words, when the maximum output of each zone is employed for calculating the main brightness based on the formula (1), the minimum brightness of the scene is employed as $B_0$. In case the minimum output of each zone is employed for calculating the main brightness based on the formula (1), the maximum brightness of the scene is employed as $B_0$. It should be noted that these combinations are merely preferable examples but not absolute.

The above coefficients $K_1$, $K_2$, $K_{i+2}$ may be changed according to the selected combination as mentioned above.

BRIEF DESCRIPTION OF THE DRAWINGS

FIG. 1 is a front view showing a light measuring portion provided with a number of light measuring elements, FIG. 2 is a front view showing an example of the divided zones of the light measuring portion, FIG. 3 is a front view showing another example of the divided zones, FIG. 9 is a circuit view showing an example of a log-conversion circuit, FIG. 10 is a circuit view showing an example of a maximum brightness detecting circuit, FIG. 11 is a circuit view showing an example of a circuit for computing the brightness used for controlling exposure, FIG. 12 is a block diagram showing an example of a digital type exposure control system in accordance with another embodiment of the present invention, FIG. 14 is a block diagram showing another embodiment of the exposure control system of the present invention, and FIG. 15 is a circuit view showing the minimum brightness detecting circuit.

DESCRIPTION OF THE PREFERRED EMBODIMENTS

Now the present invention will be described in detail with reference to the accompanying drawings as described above.

A base board 1 is provided with a number of light measuring elements $2a, 2b, \ldots 2n$ arranged in columns and rows. As the light measuring elements $2a-2n$ can be used photodiode, photovoltaic element, phototransistor, CdS, CCD etc. When CCD is used, the sensitivity thereof should be controlled according to the brightness of the scene by changing the store time since the dynamic range thereof is narrow.

The light measuring portion 1 is divided as shown in FIGS. 2 and 3. In FIG. 2, the measuring portion 1 is divided into four horizontal zones Z1, Z2, Z3 and Z4. In FIG. 3, the measuring portion 1 is divided into a central rectangular zone Z4' and three concentric surrounding zones Z3', Z2', and Z1'.

The outputs of the light measuring elements included in one zone are averaged to provide an average output for the zone or the outputs are computed to provide the maximum or minimum value for the zone. The representative output thus obtained for each zone is used as the brightness ($B_{zi}$) in the formula (1). In the formula (1), the coefficients K are determined as follows for example in case of zones divided as shown in FIG. 2.

| | |
|---|---|
| $K_1 = 1.41$ | |
| $K_3 = -0.02$ | (for zone Z1) |
| $K_4 = -0.08$ | (for zone Z2) |
| $K_5 = 0.22$ | (for zone Z3) |
| $K_6 = 0.22$ | (for zone Z4) |
| $K_2 = 0.72$ | (for average brightness) |

When the formula (1) was applied to an example employing these coefficients and as many as 1276 scenes were photographed by use of the exposure control system employing this invention, the number of improper exposures was only 44.

When, on the other hand, only the average brightness $B_0$ was used for controlling exposure, the number of the improper exposures was as may as 199. Hence, the number of improper exposures can markedly reduced in accordance with the present invention employing the weighted brightness.

When the example as shown in FIG. 3 is used, the coefficients are determined as follows for instance.

| | |
|---|---|
| $K_1 = 1.65$ | |
| $K_3 = 0.09$ | (for zone Z1') |
| $K_4 = -0.13$ | (for zone Z2') |
| $K_5 = -0.12$ | (for zone Z3') |
| $K_6 = 0.23$ | (for zone Z4') |
| $K_2 = 0.79$ | (for average brightness $B_0$) |

With these coefficients, the improper exposures were reduced to 35.

Figure 4:
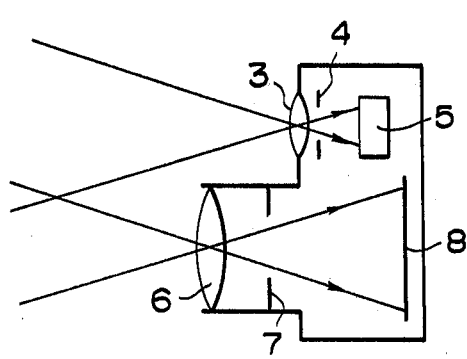
FIGS. 4 to 7 are side sectional views showing various positions of the light measuring portion provided in a camera body.

FIGS. 4 to 7 show various locations of the light measuring portion in a camera body. FIG. 4 shows an example in which the light measurement is conducted in parallel to the photographing system. An objective 3 is located in front of a light measuring portion 5 with the intervention of a stop 4 located therebetween. A taking lens 6 is provided separately therefrom in parallel thereto to focus an image on a photographic film 8 through a stop 7. Thus, the light measuring portion 5 measures the light from the object (not shown) to be photographed by the camera with the taking lens 6.

Figure 5:
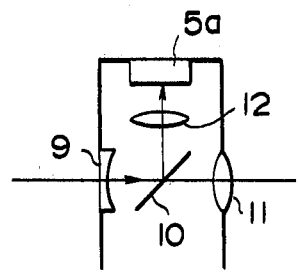

FIG. 5 shows another example in which a light measuring portion 5a is provided in a view finder. An objective 9 is provided in front of an eyepiece 11 with the intervention of a semi-transparent mirror 10 located therebetween. The semi-transparent mirror 10 reflectes a part of the light coming in through the objective 9 toward the light measuring portion 5a.

Figure 6:
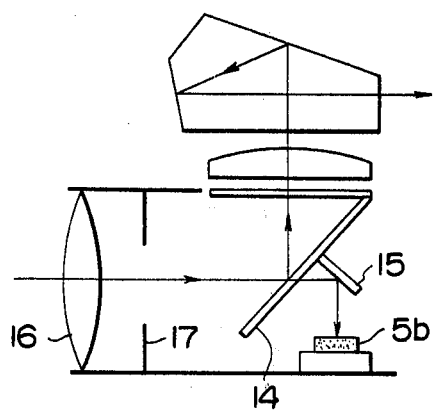

FIG. 6 shows another example in which a light measuring portion 5b is provided in a single lens reflex camera. A part of the swing-up mirror 14 is made transparent to transmit the light coming in from the taking lens 16. A concave mirror 15 is located behind the mirror 14 to reflect the light transmitting through the mirror 14 downward toward the light measuring portion 5b. A stop 17 is located behind the taking lens 16. Thus, a part of the light coming in through the taking lens 16 is focused on the light measuring portion 5b and forms a small image of the object to be photographed thereon.

Figure 7:
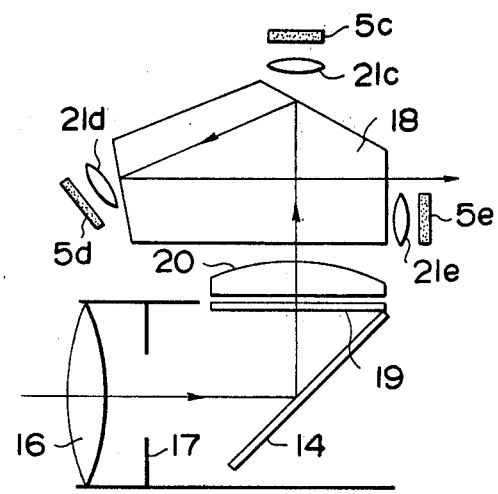

FIG. 7 shows still another example in which light measuring portions 5c, 5d and 5e are located in the vicinity of a pentagonal prism 18 of a single lens reflex camera as shown in FIG. 6. The mirror 14 reflects the light coming in from the taking lens 16 upward. The light reflected upward by the mirror 14 enters a pentagonal prism 18 though a focusing glass 19 and a condenser lens 20. The light measuring portion 5c is located above the prism 18, 5d in front thereof and 5e therebehind. In front of the respective light measuring portions 5c, 5d and 5e are located focusing lenses 21c, 21d and 21e, respectively.

Figure 8:
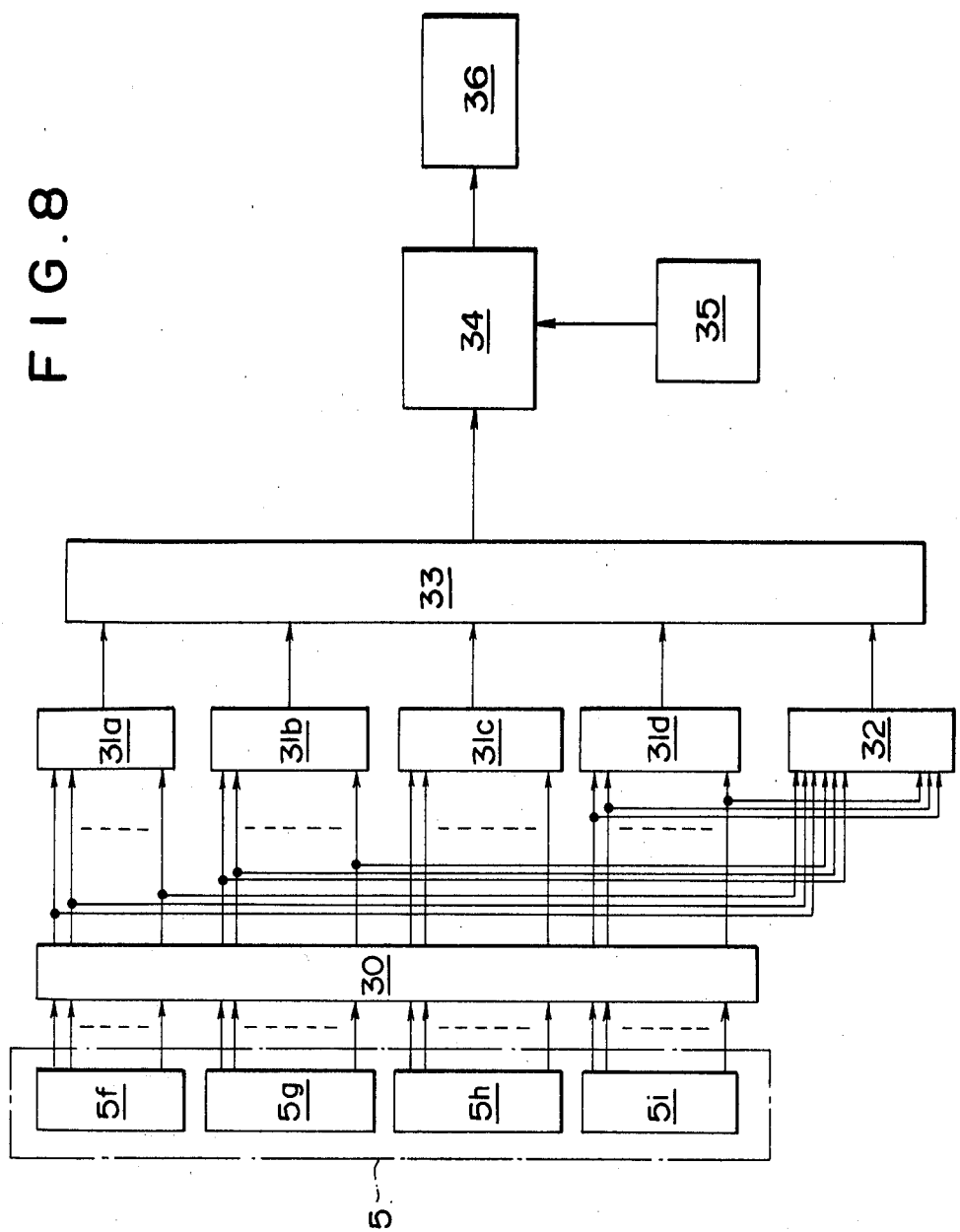
FIG. 8 is a block diagram showing an example of an analog type exposure control system in accordance with an embodiment of the present invention.

FIG. 8 shows an example of an analog type exposure control system carrying out the method of this invention. The light measuring portion 5 consists of four zone measuring sections 5f, 5g, 5h, 5i corresponding to the divided four zones Z1, Z2, Z3, Z4 or Z1', Z2', Z3', Z4'. Each zone measuring sections 5f–5i includes at least one light measuring elements as mentioned above. The number of light measuring elements included in the light measuring portion 5 are all connected to a log-conversion circuit 30. The outputs of the light measuring elements are log-converted respectively.

The log-converted outputs of the light measuring elements are sent to maximum brightness detecting circuits 31a–31d provided for the respective zones Z1–Z4, where the maximum brightness Bmax is detected for every zone.

Further, in order to compute the average brightness $B_0$ for the whole scene, the output signal of the light measuring elements are sent to the average brightness detecting circuit 32 and the average brightness $B_0$ is obtained by use of the formula of $$\sum_{i=1}^{n} B_i/n = B_0.$$

The average brightness detecting circuit 32 and the maximum brightness detecting circuits 31a–31d for computing the maximum brightness for every zone are connected with the brightness computing circuit 33, where the operation of the formula (1) is conducted to compute the scene brightness B.

The brightness information or the scene brightness B obtained by the brightness computing circuit 33 is sent to an exposure operating circuit 34 where an apex operation is conducted based on the information as of film sensitivity, aperture size or shutter speed sent from an exposure information setting circuit 35.

A signal corresponding to the aperture size or shutter speed computed by the exposure operating circuit 34 is sent to an exposure control circuit 36 which controls the aperture size or the shutter speed.

FIG. 9 shows an example of a log-conversion circuit 30 which is composed of an operational amplifier 40 and a log-diode 41 connected in parallel therewith. The log-conversion circuit 30 is provided for every light measuring element.

FIG. 10 shows an example of a maximum brightness detecting circuit 31a–31d. The outputs of the light measuring elements provided in each zone are connected to and inputed into voltage follower circuits 42a, 42b, ... 42n after log-converted. Then, after impedance-converted, the maximum brightness is detected by and outputed by diodes 43a–43n and a resistor 44.

FIG. 11 shows an example of a brightness computing circuit 33. Resistors 45a–45c, resistor 46 and an inversion amplifier 47 constitute an inversion amplifying adder. The adder is provided with the maximum zone brightness or the average brightness $B_0$ which has a negative coefficient K in the formula (1). Similarly, resistors 48a–48c, a resistor 49,50 and non-inversion amplifier 51 constitute an inversion amplifying adder. The adder is provided with the signals which has the positive coefficients K in the formula (1). Then, the resistance of the resistors 45a–45c, 48a–48c which is determined in advance according to the coefficients K serve for the weighted addition.

After the outputs are summed up with the coefficients K, which means the outputs are added and/or subtracted according to the positive and/or negative coefficients K, the summed up output is inputed into an inversion amplifying adder consisting of resistors 52a,52b,53 and an inversion amplifier 54. From the inversion amplifier 54 is outputed a signal corresponding to the scene brightness B.

FIG. 12 shows an example of a digital type exposure control system embodying the present invention. The outputs of the light measuring elements of the light measuring portion 5 are inputed into the log-conversion circuits 60a,60b ... 60n to be log-converted.

The outputs of the log-conversion circuits 60a–60n are inputed into comparators 61a–61n. The comparators 61a–61n compare the comparison signals from the D/A converter 62 with the log-converted signal.

A multiplexer 63 is connected with the outputs of the comparators 61a–61n for selecting one of the comparators based on a multiplexer address signal 65 from the micro-computer 64 connected therewith. After one comparator 61a for instance is selected by the multiplexer 63 a comparison signal 66 for count-up is sent to the D/A converter 62 to obtain an analog comparison signal. The comparison signal which gradually increases is compared with the signal from the log-conversion circuit 60a by the comparator 61a. When both the signals agree with each other, an agreement signal 67 is outputed from the comparator 61a and inputed into the microcomputer 64, where the comparing signal 66 is memorized as an A/D converted value.

Since the address of the light measuring element is known from the multiplexer address signal 65 and the data are known from the comparison signal 66, the data are memorized in the RAM 68 at the corresponding address thereof.

Then, after the multiplexer address signal 65 is incremented the output signal of the log-conversion circuit 60b is A/D converted similarly to said example and memorized in the RAM 68.

A ROM 69 connected with the microcomputer 64 is provided with a program for taking up data, detecting the maximum brightness $B_{max}$, the average brightness $B_0$, the operation of the formula (1) and the operation for exposure control.

By the information signal 70 from the camera side, the operation for exposure control is conducted. The shutter control circuit 71 serves as a timer as well as a buffer which receives as an input a code signal from the microcomputer 64 and provides an output of a shutter control signal 72. Further, the microcomputer 64 outputs an aperture control signal.

Figure 13:
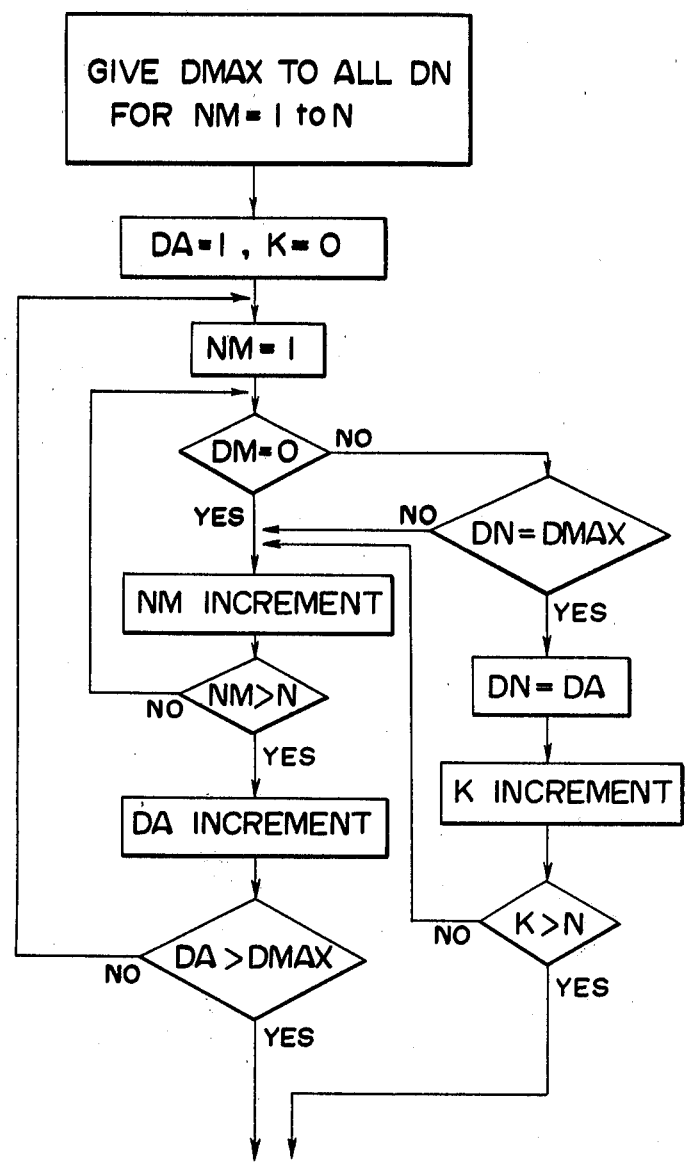
FIG. 13 is a flow chart showing the program of taking up data for controlling exposure.

FIG. 13 shows the data input method for memorizing the A/D converted data in the RAM 68, in which the reference characters means the following factors:

DM: log-converted output of the light measuring element
DA: set value of D/A converter
NM: address of the light measuring element
NA: address of RAM corresponding to NM
N: number of the light measuring elements
DMAX: maximum value which can be set by the D/A converter
DN: content of NA FIG. 14 shows another embodiment of the present invention in which a log-conversion circuit 60 is connected with the multiplexer 63 for log-compressing the output of the multiplexer 63. The log-compressed signal is converted to a digital signal 76 by an A/D converter 75 which is controlled by a control signal 74, and memorized in the RAM 68.

In the above described embodiments, the light measuring elements provide the maximum brightness in each zone by use of the maximum brightness detecting circuit as shown in FIG. 10. In case that the minimum brightness is to be detected instead of the maximum brightness, a minimum brightness detecting circuit as shown in FIG. 15 may be used. The outputs of the light measuring elements are inputed into voltage follower circuits 77a–77n and after impedance-converted thereby the outputs are inputed into diodes 78a–78n connected in parallel and a resistor 79. By means of the diodes 78a–78n and the resistor 79, the minimum voltage can be detected and outputed. Hence, the minimum brightness can be detected.

I claim:

1. A method of controlling exposure for a camera based on the scene brightness measured by light measuring elements comprising the steps of;

dividing a light measuring area in a camera into a plurality of zones, providing at least one light measuring element in each of said zones, obtaining the maximum or minimum brightness ($B_{zi}$) in each of said zones, obtaining an average brightness ($B_0$) from the outputs of all the light measuring elements provided in said light measuring area, obtaining a weighted sum of the brightness based on a formula of $$\sum_{i=1}^{n} K_{1+2}$$

where $K_{i+2}$ is a coefficient and n is the number of the zones, computing a scene brightness (B) by use of a formula of $$B = K_1 + K_2 \cdot B_0 + \sum_{i=1}^{n} K_{1+2} B_{zi}$$

where $K_1, K_2, K_{i+2}$ are coefficients, and controlling exposure of the camera based on the scene brightness (B).

* * * * *